(12) United States Patent
Gaudfrin

(10) Patent No.: US 9,487,360 B2
(45) Date of Patent: Nov. 8, 2016

(54) DEVICE FOR EXTRACTING CAKES RESULTING FROM PRESSURIZED DISC FILTRATION, AND ASSOCIATED EXTRACTION METHOD

(75) Inventor: Guy Gaudfrin, Saint Non la Breteche (FR)

(73) Assignee: GAUDFRIN, Saint Germain en Laye (FR)

( * ) Notice: Subject to any disclaimer, the term of this patent is extended or adjusted under 35 U.S.C. 154(b) by 1020 days.

(21) Appl. No.: 13/126,816

(22) PCT Filed: Oct. 30, 2008

(86) PCT No.: PCT/FR2008/001530
§ 371 (c)(1),
(2), (4) Date: Apr. 29, 2011

(87) PCT Pub. No.: WO2010/049598
PCT Pub. Date: May 6, 2010

(65) Prior Publication Data
US 2011/0204001 A1     Aug. 25, 2011

(51) Int. Cl.
*B01D 33/21*    (2006.01)
*B65G 53/46*    (2006.01)
(Continued)

(52) U.S. Cl.
CPC ........... *B65G 53/4691* (2013.01); *B01D 33/21* (2013.01); *B01D 33/68* (2013.01);
(Continued)

(58) Field of Classification Search
CPC ........ B65G 3/04; B65G 53/40; B65G 53/46; B65G 53/4691; B65G 43/60; B65G 53/66; B65G 53/4608; B65G 53/4625; B65G 53/4633; B65G 53/465; B01D 2251/404; B01D 2251/604; B01D 2258/0283; B01D 53/505; B01D 53/80; B01D 17/0205; B01D 19/001; B01D 1/0082; B01D 1/02; B01D 1/28; B01D 2251/402; B01D 2253/108; B01D 2257/2045; B01D 2257/2068; B01D 33/21; B01D 33/215; B01D 33/58; B01D 33/68; B01D 33/76; B01D 33/763; B01D 33/766; B01D 33/807; B01D 2201/167; B01D 2201/202; B01D 2201/345
USPC ......... 414/199–203, 221; 210/327, 330, 331, 210/332, 346, 391, 396, 397, 86
See application file for complete search history.

(56) References Cited

U.S. PATENT DOCUMENTS 1,754,667 A * 4/1930 Cabrera ......................... 210/299
2,352,303 A * 6/1944 Young ........................... 210/217
(Continued)

FOREIGN PATENT DOCUMENTS

DE   3902564 C1 * 1/1989 ............. E21F 15/10
FR   1215168        4/1960
(Continued)

OTHER PUBLICATIONS

Definition of word "fork" from Oxford Dictionaries, accessed on Dec. 13, 2014.*
(Continued)

*Primary Examiner* — Lucas Stelling
(74) *Attorney, Agent, or Firm* — Frommer Lawrence & Haug LLP

(57) ABSTRACT

The present invention relates to a device for extracting cakes resulting from pressurized filtration from a sealed tank (1) in which rotary filters (2) are provided, the tank being provided with a hopper (1*b*) for recovering solid particles and having an extension, in the lower portion thereof, in the form of a hatch (10) defined between at least two temporary blocking members (11, 12), characterized in that each temporary blocking member includes a rotary shaft (100) transversally arranged in the hatch and bearing at least one set (101, 102, 103) of two diametrically opposite radial fins having a global surface substantially corresponding to the cross-section of the hatch (10) and optionally at least one set of two radial forks (104, 105), as well as peripheral sealing means(102) mounted on the inner wall of the hatch opposite the end edge of said fins. The invention also relates to an associated extraction method.

13 Claims, 7 Drawing Sheets

Figure 1:
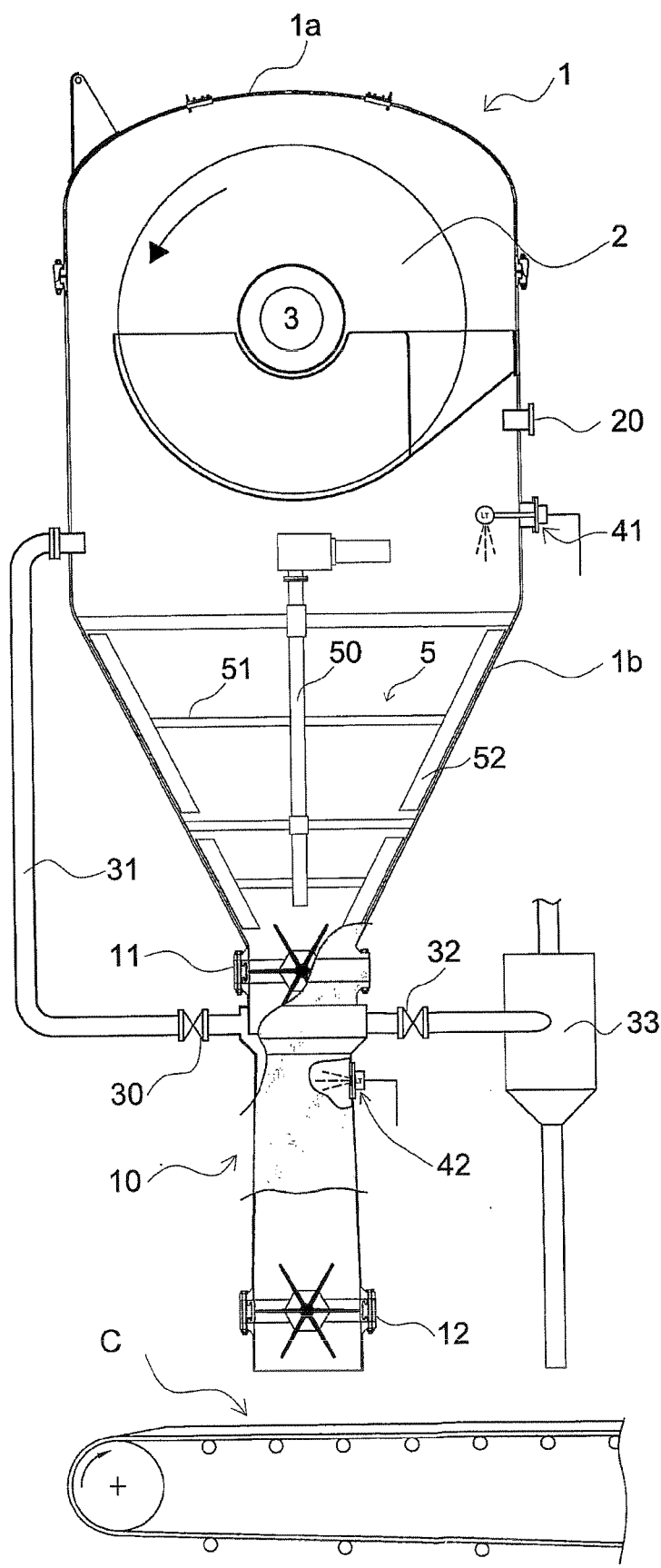

(51) Int. Cl.
    *B01D 33/76*    (2006.01)
    *B01D 33/80*    (2006.01)
    *B65G 53/66*    (2006.01)
    *B01D 33/68*    (2006.01)

(52) U.S. Cl.
    CPC ......... *B01D 33/766* (2013.01); *B01D 33/807* (2013.01); *B65G 53/4625* (2013.01); *B65G 53/66* (2013.01); *B01D 2201/167* (2013.01); *B01D 2201/202* (2013.01); *B01D 2201/345* (2013.01)

(56) References Cited

U.S. PATENT DOCUMENTS

| | | | | |
|---|---|---|---|---|
| 3,405,838 A | * | 10/1968 | Preisendanz | 220/203.13 |
| 4,089,429 A | | 5/1978 | Stock et al. | |
| 4,137,935 A | * | 2/1979 | Snowdon | 137/242 |
| 5,470,473 A | * | 11/1995 | Park et al. | 210/402 |
| 5,630,691 A | * | 5/1997 | Newbolt | 414/219 |
| 5,678,971 A | | 10/1997 | Hiorth | |

FOREIGN PATENT DOCUMENTS

| | | | |
|---|---|---|---|
| GB | 486927 | 6/1938 | |
| GB | 939975 | 10/1963 | |
| GB | 2 231 504 A | 11/1990 | |
| JP | 2005118754 A | 5/2005 | |
| SU | 1033411 A | 8/1983 | |
| WO | WO 8912903 A1 * | 12/1989 | ............... H01F 7/18 |
| WO | WO 2008/038335 A | 4/2008 | |
| WO | WO 2008038335 A1 * | 4/2008 | ........... B01D 33/073 |

OTHER PUBLICATIONS

Office action dated Jan. 3, 2013 issued by the Kazakhstan Patent Office for corresponding Kazakhstan application No. 2011/1550.1 with English translation.

* cited by examiner

DEVICE FOR EXTRACTING CAKES RESULTING FROM PRESSURIZED DISC FILTRATION, AND ASSOCIATED EXTRACTION METHOD

This application is a 371 of PCT/FR2008/001530 filed on Oct. 30, 2008, published on May 6, 2010 under publication number WO 2010/049598 A, the entire disclosure of which is incorporated herein by reference.

The present invention relates to installations and to methods for liquid/solid separation and more particularly to a device for extracting cakes resulting from pressurized disk filtration and to an associated extraction method.

The prior art, and in particular FR 1215168, discloses devices for pressurized disk filtration.

This type of device comprises a chamber formed by a sealed vessel, in which there are housed disks that are lined with a filter cloth covering and are fitted on a rotary shaft, at least one inlet pipe for liquid laden with solid particles, at least one filtrate outlet pipe and a hopper for collecting agglomerated solid particles, said hopper being extended in its lower part by an airlock defined between at least two temporary-closure elements.

The technique of pressurized filtration requires the use of a sealed and robust chamber and also of a device for extracting solid deposits or dry cakes.

However, in return, it makes it possible to increase the separation efficiency, to treat the suspensions at high temperatures and to provide improved drying of the cakes.

Devices of this type are applied more particularly in the sugar industry and in the mineral industry.

The cakes which are dried under pressure become very dry and cannot be extracted by traditional pumping means.

Some extraction devices comprise an airlock defined by two knife gate valves or plate shutters which present maintenance problems and which, furthermore, do not make it possible to control the rate of extraction, thereby causing an increased risk of impacts due to random and abrupt dropping of the cakes contained in the airlock.

The present invention intends to remedy these technical problems in an effective and satisfactory manner.

This aim is achieved, in accordance with the present invention, by means of a device for extracting cakes resulting from pressurized filtration from a sealed vessel in which rotary filters are housed, said vessel being provided with a hopper for collecting solid particles, said hopper being extended in its lower part by an airlock defined between at least two temporary-closure elements, characterized in that each temporary-closure element comprises a rotary shaft which is arranged transversely in the airlock and carries at least one set of two diametrically opposed radial blades, the overall surface area of which corresponds approximately to the cross section of the airlock, and also peripheral sealing means which are mounted on the inner wall of the airlock facing the end edge of said blades.

According to an advantageous feature, the device comprises a rotary scraper intended to collect the cakes which have been detached from the disks in the bottom of the hopper.

According to another advantageous feature, the hopper and/or the airlock are equipped with at least one sensor for detecting the level of solid matter.

According to yet another feature, the rotary shafts of the closure elements are driven by variable-speed motors/geared motors.

Preferably, the geared motors are coupled to the level sensors.

According to yet another feature, the airlock comprises a pressurizing valve that provides the connection to the pressurized vessel and a decompression valve that provides the connection to the atmosphere.

Preferably, the decompression valve is connected to a cyclone for collecting dust.

According to a specific variant embodiment, the rotary shaft carries at least two sets of equidistant radial blades.

According to another embodiment, the rotary shaft carries at least two forks, which are fixed radially on either side of the blades.

The number and relative position of the blades and the forks depends on the rheological nature of the solid matter to be extracted.

According to another variant, said sealing means comprise an inflatable seal fitted on a cylindrical body which is inserted between two flanges provided at the ends of the airlock.

Another subject of the invention is a method for extracting cakes, characterized in that the airlock is connected to the pressurized vessel, the level of cakes in the hopper is measured continuously by comparing it with a reference maximum level which, once it is reached, automatically triggers the opening of the upper closure element, then the filling level of the airlock is measured, said airlock, once it is full, automatically closing the upper closure element, then the airlock is isolated from the vessel and is connected to the atmosphere and the lower closure element is opened in order to extract the cakes.

Advantageously, the closure elements are sealed and closed by expansion of the peripheral seal, confining the edge of the radial blades, whereas said elements are opened and released by prior deflation of the seal with the shafts carrying said blades then being set into rotation.

Preferably, the cakes are extracted from the vessel in a volumetric manner at a rate proportional to the speed of rotation of the shafts.

The movement of the shaft is stopped by proximity contacts when a set of two radial blades forming a disk is located in the plane of the seal perpendicular to the longitudinal axis of the airlock.

The device and the method of the invention make it possible to control the rate of extraction of solid matter and also make it possible, by virtue of the prior deflation of the seal, to prevent friction, which brings about wear, in particular in an abrasive environment.

The invention makes use of a simple extraction method that can be implemented continuously or semi-continuously and which can be entirely automated.

Figure 2A:
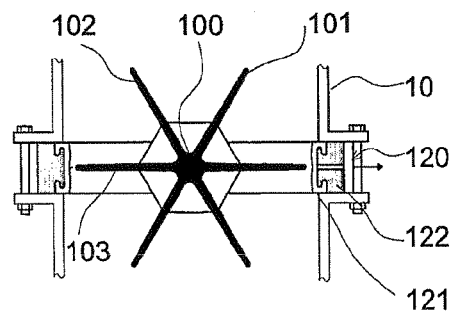
Figure 2B:
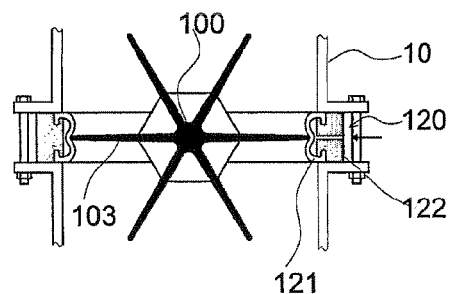
Figure 2C:
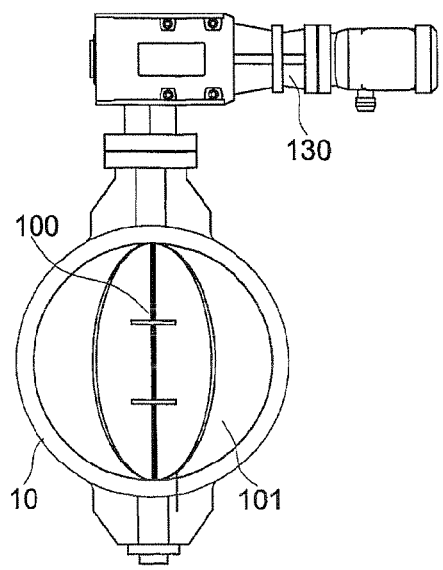

The invention will be understood better from reading the following description, with reference to the appended drawings, in which:

FIG. 1 shows a schematic assembly view of an installation for pressurized filtration, equipped with an embodiment of a device for extracting cakes according to the invention, FIGS. 2A and 2B show sectional views of an embodiment of the extraction device according to the invention, FIG. 2C shows a top view of the device from FIGS. 2A and 2B, FIGS. 3A and 3B respectively show the sectional view and the top view of an extraction element which has a single set of blades and is provided with forks, and FIGS. 4A to 4D show partial schematic views of the state of the extraction device from FIG. 1 during successive steps of the method of the invention.

The installation shown in FIG. 1 is intended for liquid/solid separation by pressurized filtration.

This installation comprises an external chamber formed in this case by a vertical vessel 1, the cylindro-conical structure of which is sealed and reinforced in order to withstand internal pressures of around 10 barg.

This pressure is created by injecting compressed air through the tube 20.

Such an installation is intended to separate the calcium carbonates in the sugar industry, and to dry the residues or "tailings" that result from mineral dressing, the ore that is transported hydraulically, coal and more generally any residue prior to spreading.

The vessel is connected to at least one inlet pipe for liquid laden with solid particles and at least one filtrate outlet pipe (not shown).

A conveyor C is arranged under the vessel in order to evacuate the solid matter after extraction.

The vessel 1 includes a number of filtering disks 2 that are arranged vertically and parallel to one another.

The disks 2 are mounted on a rotary shaft 3 that extends horizontally in the vessel 1.

The structure of the disks is traditional and consists of sectors defined by a metal framework, each sector being lined with a filter cloth covering (not shown) and being connected radially to a filtrate outlet pipe that is formed inside the shaft 3.

The upper part has a dome 1a forming the lid of the vessel 1.

The lower part of the vessel 1 corresponds to the extraction zone for the solid matter and has a hopper 1b for collecting the deposits or dry cakes that have been detached from the disks 2.

Given the position of the disks in the vessel, the cakes tend to fall asymmetrically into the hopper and it is thus necessary to collect them in the conical bottom by way of a rotary scraper 5.

The scraper 5 comprises, as shown in the figures, a motorized central shaft 50. The shaft 50 carries spokes 51, at the ends of which are mounted inclined blades 52 which are moved in contact with the frustoconical wall of the hopper 1b.

The bottom of the hopper is extended, in its lower part, by an airlock 10 defined between at least two, respectively upper 11 and lower 12, temporary-closure elements.

The airlock 10 is equipped with a pressurizing valve 30, which is connected via the pipe 31 to the pressurized vessel 1, and with a decompression valve 32, which provides the connection to the atmosphere.

The decompression valve 32 is connected to a cyclone 33 for collecting dust.

As is shown in FIGS. 2A, 2B and 2C, each temporary-closure element 11, 12 comprises a rotary shaft 100 that is arranged transversely in the airlock and carries at least one set of two diametrically opposite radial blades 101, forming a disk.

Figure 3A:
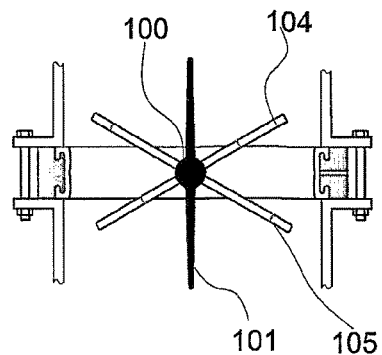
Figure 3B:
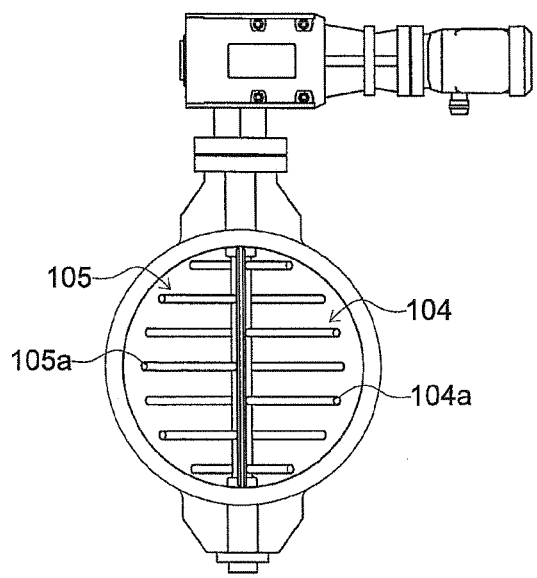

In the variant shown in FIGS. 3A and 3B, the rotary shaft 100 also carries at least one set of two forks 104 and 105, which are fixed radially on either side of the disk and the prongs 104a, 105a of which are preferably arranged in an offset manner with respect to one another.

The overall surface area of the set of blades 101 corresponds approximately to the cross section of the airlock 10 as is illustrated in FIG. 2C.

Preferably, the shaft 100 carries three sets of blades 101, 102, 103 in the manner of a bladed disk, as in the variant illustrated in the figures.

However, depending on the rheological nature of the cakes, the shaft can also have just one set of two blades 101 and forks 104 and 105 fixed radially in a similar way to other blades.

Each of the closure elements furthermore comprises peripheral sealing means 120 that are mounted on the inner wall of the airlock 10 facing the end edge of said blades.

These sealing means comprise in this case an inflatable annular seal 121 mounted on a cylindrical body 122 which is inserted between the flange of the hopper and that of the airlock with regard to the upper closure element and between the flange of the airlock and that of the outlet channel with regard to the lower closure element.

The seal can be inflated in a hydraulic or pneumatic manner.

The hopper 1b and/or the airlock 10 is/are equipped with at least one and preferably two sensors 41, 42 which are shown in FIG. 1 and detect and locally measure the level of solid cake matter.

Each of the rotary shafts 100 of the closure elements is driven by a separate variable-speed motor/geared motor unit 130.

These variable-speed motors/geared motors, which can be seen in FIG. 2C, are coupled to the level sensors 41, 42.

The method for extracting the cakes according to the invention will now be described with reference to the device illustrated in FIGS. 4A to 4D.

When the filtration disks 2 are put into operation, the closure elements 11, 12 of the airlock 10 are put into the closed position, and the valve 32 is closed, whereas the valve 30 is open in order to produce a pressure equilibrium between the airlock 10 and the inner volume of the vessel 1.

Figure 4A:
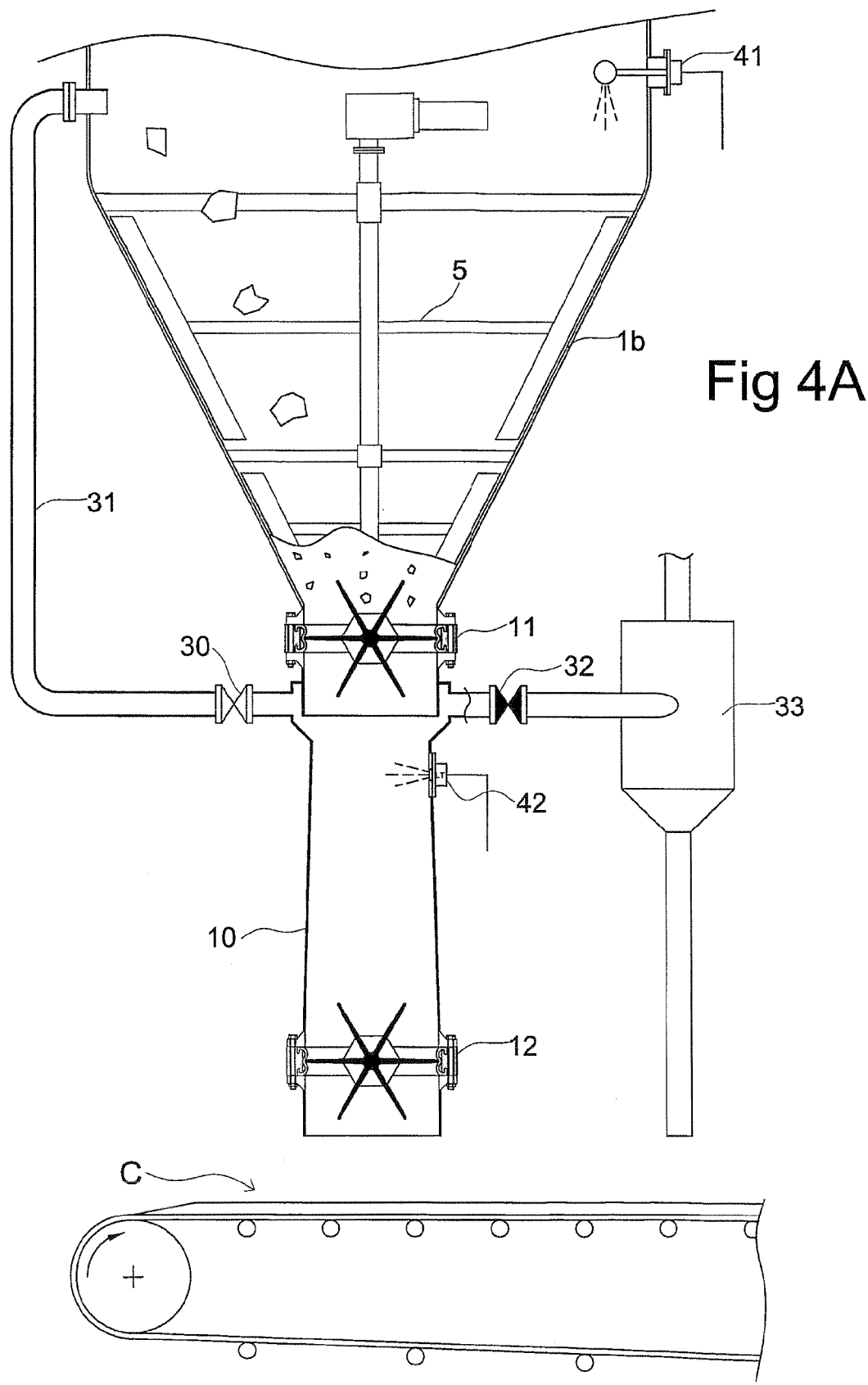

The sealed closed position of the closure elements is obtained by rotating the shaft 100 to move one of the sets of blades into a plane perpendicular to the longitudinal axis of the airlock 10 and then inflating the seals 121, as is shown for the lower closure element 12 in FIGS. 2B and 4A.

The inflation pressure of the seal 121 presses it against the edges of the blades 103, thereby providing the desired seal.

The hopper 1b fills progressively with solid matter which is detached from the filtration disks 2 and accumulates by gravity above the upper closure element 11.

The level of cakes in the hopper is measured continuously by means of the top sensor 41, which is located on the inner wall of the hopper 1b.

When the top sensor 41 detects that the level of cakes corresponds to the setpoint value, an activation signal is sent automatically to the upper closure element 11.

Figure 4B:
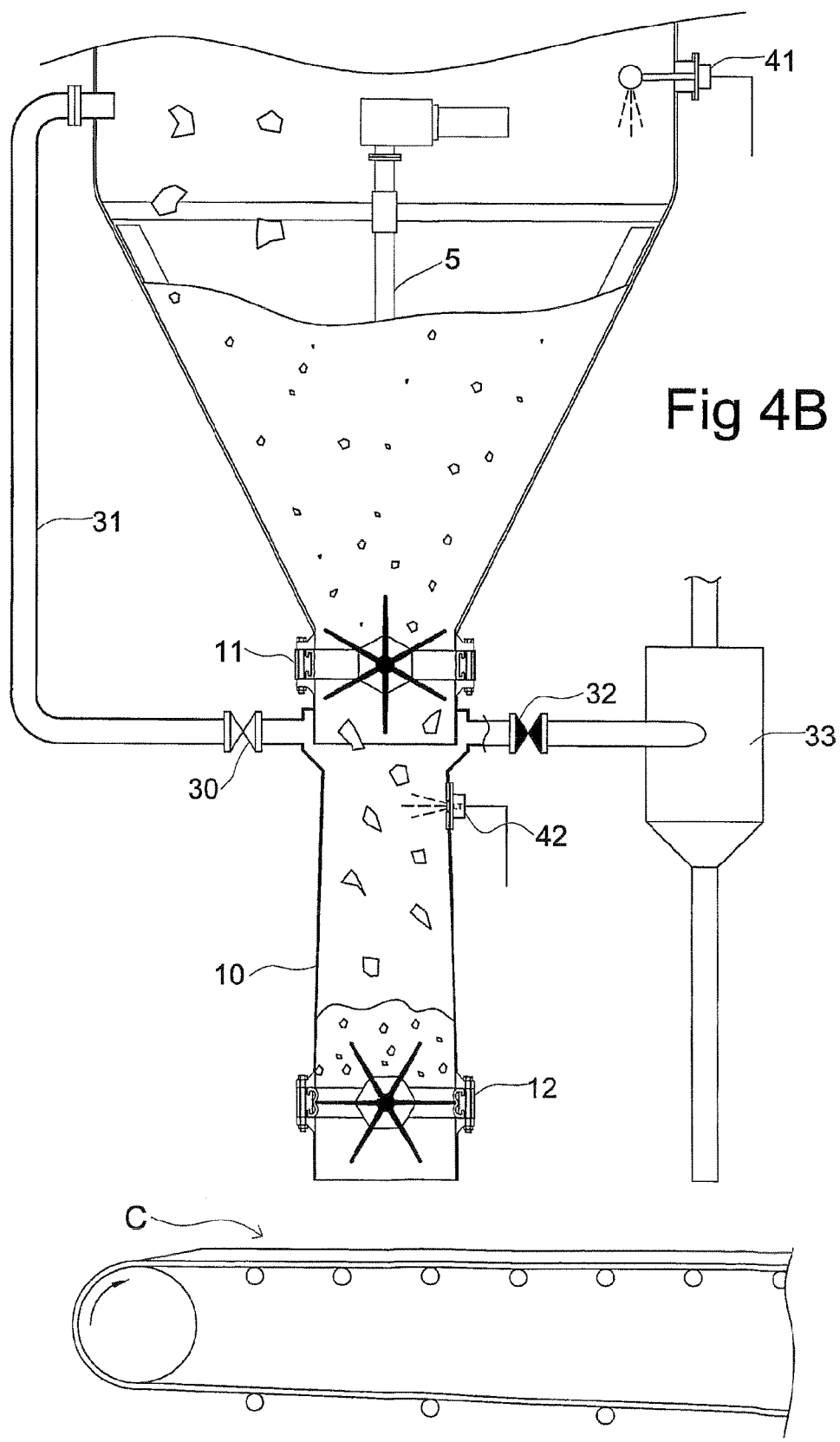

This signal first of all causes the seal to be broken by rapid deflation of the seal 121 followed by the releasing of the blades 103 and the starting up of the variable-speed motor/geared motor 130 so as to set the shaft 100 into rotation, as is illustrated in FIGS. 3B and 4B.

At this stage, the lower closure element 12 is held in the sealed closed position.

The airlock 10 thus fills progressively and proportionally to the speed of rotation of the shaft 100, and its filling level is measured.

Preferably, the cakes are extracted from the vessel in a volumetric manner at a rate proportional to the speed of rotation of the shaft 100.

When the bottom sensor 42, which is located on the inner wall of the airlock, below the upper closure element 11, detects that the maximum setpoint level has been reached, a signal is sent automatically to the upper closure element 11 and to its associated geared motor 130 in order to stop the rotation of the shaft 100 and to inflate the seal 121.

Figure 4C:
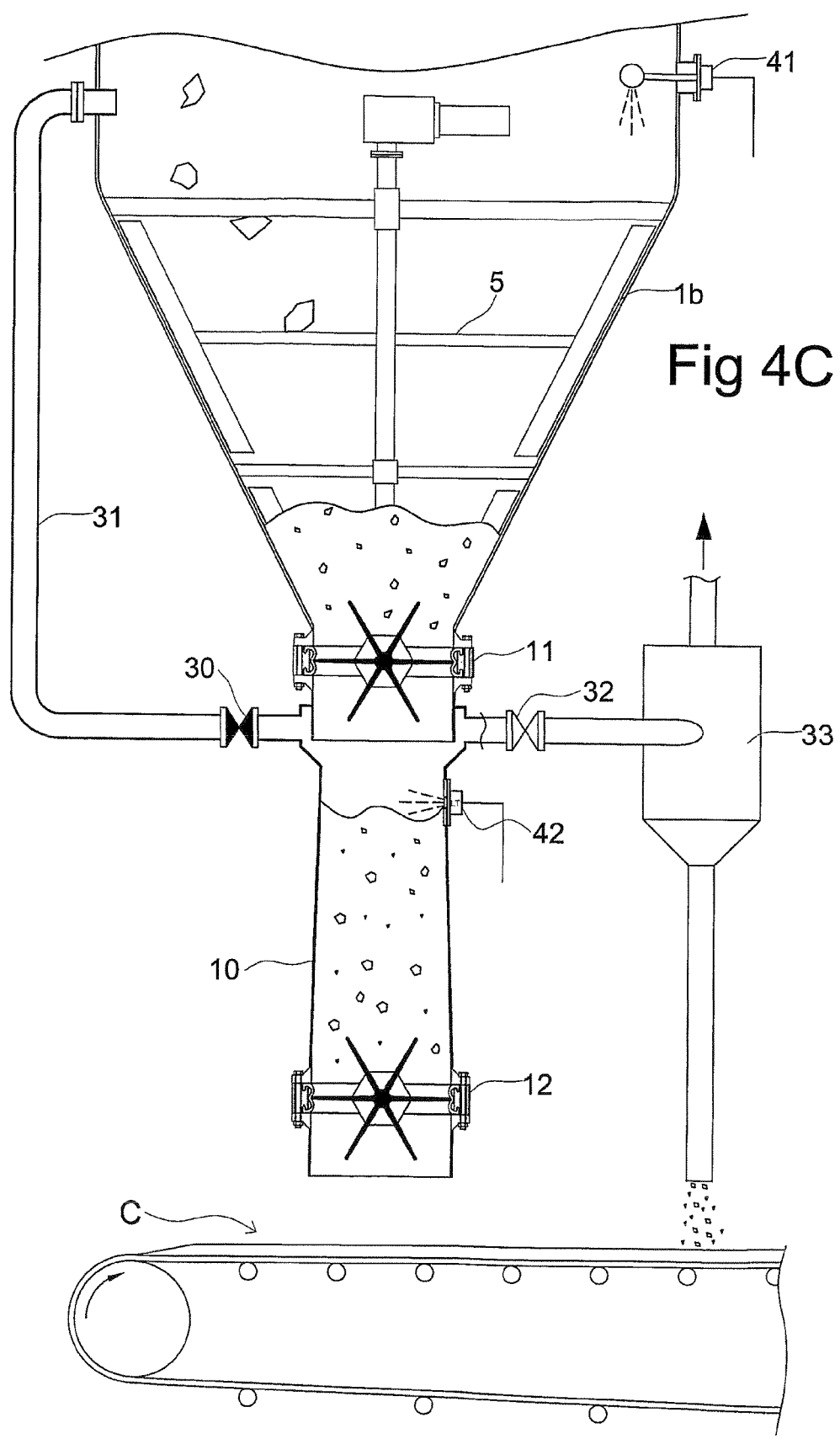

The airlock is then isolated from the vessel by the pressurizing valve 30 being closed, and then the airlock is vented via the valve 32 and the cyclone 33, as is shown in FIG. 4C.

As soon as the internal pressure in the airlock 10 reaches atmospheric pressure, the lower closure element 12 receives a signal which causes the deflation of the seal 121 and starts up the associated variable-speed motor/geared motor.

Figure 4D:
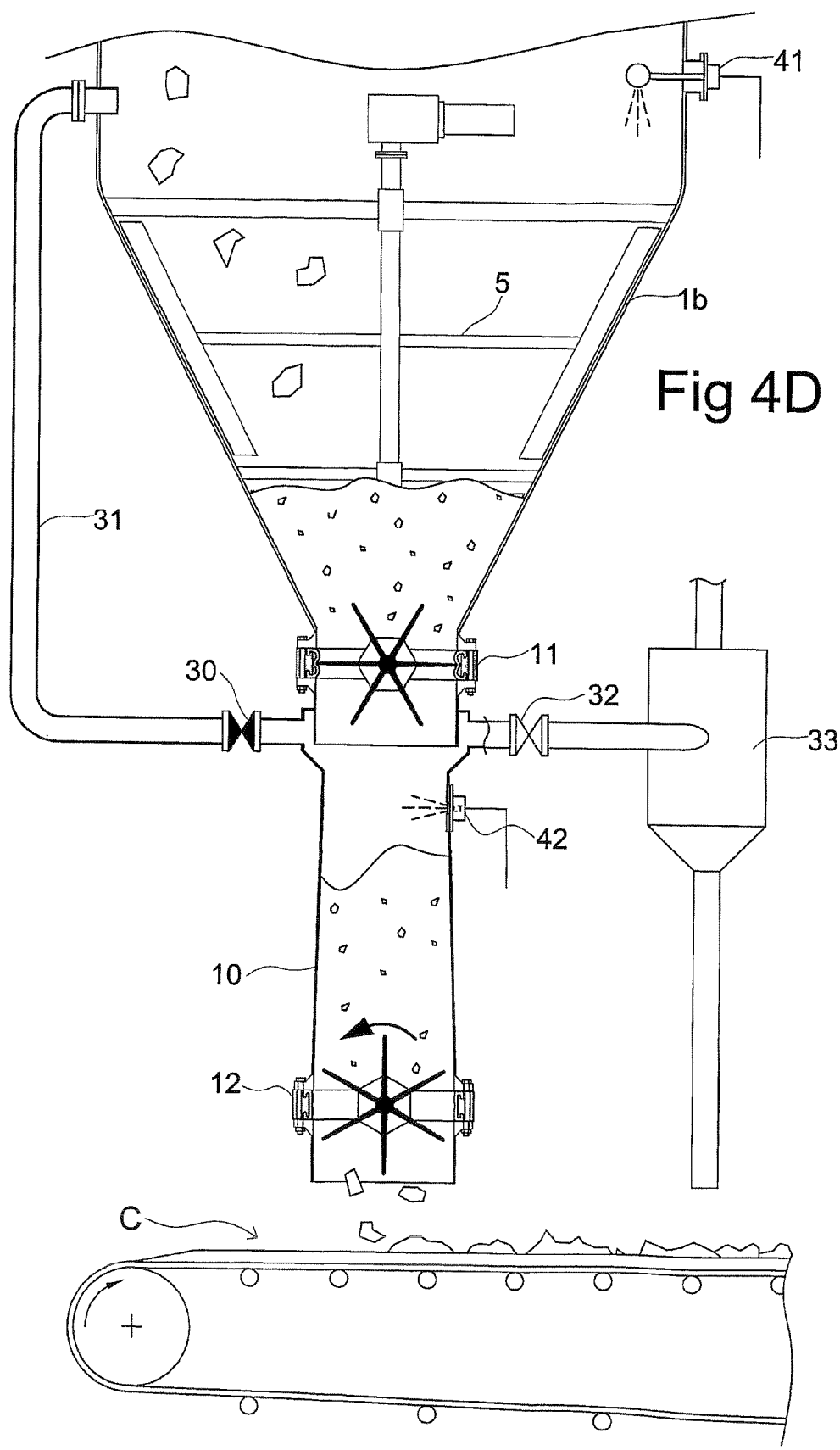

The shaft 100 is then set into rotation, thereby emptying the airlock and discharging the cakes onto the conveyor C in order to evacuate them from the site, as is illustrated in FIG. 4D.

The invention claimed is:

1. A device for extracting cakes resulting from pressurized filtration, the device comprising a sealed vessel in which rotary filters are housed, said vessel being provided with a hopper for collecting solid particles, said hopper being extended longitudinally in the lower part by an airlock defined between at least two temporary-closure elements, wherein each temporary-closure element comprises a rotary shaft which is arranged transversely in the airlock and includes at least one set of two diametrically opposed radial blades, an overall surface area of which corresponds approximately to a cross section of the airlock, peripheral sealing means associated with each temporary-closure element, mounted on an inner wall of the airlock, facing peripheral outer end edges of said set of blades, and including a single annular expandable seal mounted on the inner wall of the airlock, when expanded the single annular expandable seal expands in a plane perpendicular to a longitudinal axis of the airlock and contacts the entire length of the peripheral outer end edges of said set of blades to seal the air lock around the entire length of the periphery of the set of blades, the single annular expandable seal containing the axis of rotation of the blades and sealing the transversal section of the airlock.

2. The device as claimed in claim 1, wherein the device comprises a rotary scraper to collect the cakes which have been detached from disks in a conical bottom portion of the hopper.

3. The device as claimed in claim 1, wherein the hopper and/or the airlock are equipped with at least one level sensor for detecting the level of solid matter.

4. The device as claimed in claim 1, wherein the rotary shafts of the temporary-closure elements are driven by variable-speed motors and/or geared motors.

5. The device as claimed in claim 4, wherein the variable-speed motors and/or geared motors are coupled to at least one level sensor.

6. The device as claimed in claim 1, wherein the airlock comprises a pressurizing valve that provides the connection to the pressurized vessel and a decompression valve that provides the connection to the atmosphere.

7. The device as claimed in claim 5, wherein the decompression valve is connected to a cyclone for collecting dust.

8. The device as claimed in claim 1, wherein each rotary shaft carries three sets of equidistant radial blades.

9. The device as claimed in claim 1, wherein each rotary shaft includes at least two forks which are fixed radially on either side of the blades.

10. The device as claimed in claim 1, wherein said singular annular expandable seal is inflatable.

11. A method for extracting cakes resulting from pressurized filtration using the device of claim 1, comprising: continuously measuring a level of cakes in the hopper and comparing the level with a reference maximum level, then once the maximum level is reached, automatically triggering the opening of an upper of the temporary-closure elements, then measuring the filling level of the airlock and once the airlock is full, automatically closing the upper temporary-closure element so that the airlock is isolated from the vessel, connecting the airlock to the atmosphere, and opening a lower of the temporary-closure elements to extract the cakes.

12. The extraction method as claimed in claim 11, wherein the temporary-closure elements are sealed and closed by expansion of the peripheral sealing means against the edge of the radial blades, and also said temporary-closure elements are opened and released by prior deflation of the peripheral sealing means before the shafts carrying said blades are set into rotation.

13. The extraction method as claimed in claim 11, wherein the cakes are extracted from the vessel in a volumetric manner at a rate proportional to the speed of rotation of the shafts.

* * * * *